United States Patent
Yamaguchi et al.

(10) Patent No.: US 9,030,509 B2
(45) Date of Patent: May 12, 2015

(54) DISPLAY DEVICE AND DISPLAY CONTROL SYSTEM

(71) Applicant: Panasonic Corporation, Osaka (JP)

(72) Inventors: Hiroshi Yamaguchi, Osaka (JP); Kazuhiro Yamada, Osaka (JP); Takashi Yamada, Osaka (JP); Yosuke Asai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 65 days.

(21) Appl. No.: 13/929,693

(22) Filed: Jun. 27, 2013

(65) Prior Publication Data

US 2014/0028743 A1    Jan. 30, 2014

(30) Foreign Application Priority Data

Jul. 27, 2012 (JP) .................................. 2012-166786
Apr. 19, 2013 (JP) .................................. 2013-088158

(51) Int. Cl.
G06F 3/03        (2006.01)
G09G 5/02        (2006.01)

(52) U.S. Cl.
CPC .............. G09G 5/02 (2013.01); G06F 3/0321 (2013.01); G06F 3/0317 (2013.01)

(58) Field of Classification Search
None
See application file for complete search history.

(56) References Cited

U.S. PATENT DOCUMENTS

| 4,924,505 | A | 5/1990 | Leberl et al. |
| 5,477,012 | A | 12/1995 | Sekendur |
| 5,661,506 | A | 8/1997 | Lazzouni et al. |
| 6,597,427 | B1 * | 7/2003 | Katsu et al. ................... 349/192 |

FOREIGN PATENT DOCUMENTS

| JP | 07-141104 A | 6/1995 |
| JP | 2001-306253 A | 11/2001 |
| JP | 2006-141061 A | 6/2006 |
| JP | 2007-018146 A | 1/2007 |
| JP | 2007-226577 A | 9/2007 |
| JP | 2009-123054 | 6/2009 |
| WO | WO 01/26034 A1 | 4/2001 |

OTHER PUBLICATIONS

International Search Report issued in PCT/SE/01898 with Date of mailing Jan. 17, 2001.

* cited by examiner

*Primary Examiner* — Joseph Haley
(74) *Attorney, Agent, or Firm* — McDermott Will & Emery LLP (57) ABSTRACT

A display device 2 includes: a display panel 50 having a display area; and a plurality of position information patterns 3 arranged on the display area and each representing information regarding a position thereof on the display area. Each position information pattern 3 is formed of a plurality of optically readable marks 31 that are formed from a material that transmits visible light. On the display area, a plurality of sub-pixels 5R, 5G, and 5B whose colors are different from each other are repeatedly aligned in a determined alignment direction. A length L between both ends of the mark 31 in the alignment direction meets a relational expression of $n \times P + w \leq L \leq (n+1) \times P - w$ (n is an integer of 0 or greater) where a width of the sub-pixel in the alignment direction is w and a pitch between the pixels 5 in the alignment direction is P.

8 Claims, 9 Drawing Sheets

DISPLAY DEVICE AND DISPLAY CONTROL SYSTEM

BACKGROUND

1. Field

The present disclosure relates to a display device that enables a handwriting input on a display surface, and the like.

2. Description of the Related Art

Hitherto, a display device is known which enables a handwriting input on a display surface.

Japanese Laid-Open Patent Publication No. 2007-226577 describes a technology in which when characters or the like are written on paper with a pen, the information written on the paper is computerized and transmitted to a server or a terminal.

In addition, as a display device that enables a handwriting input on a display surface, a display device is known in which an input coordinate on a display surface is detected with an input pen or the like by a method such as a resistive pressure method or a capacitance method and information such as a character is displayed on the basis of the detected coordinate information. In a display device, a coordinate pointing range on the display surface and a display screen are associated with each other. When the input pen is moved on the display surface, information such as a character is displayed on the display screen in accordance with the movement.

SUMMARY

The present disclosure provides a display device that reduces influence of position information patterns, arranged on a display area, on the visibility of an image.

A display device according to the present disclosure includes: a display panel having a display area on which a plurality of pixels each including a plurality of sub-pixels whose colors are different from each other are arranged in a matrix manner; and a plurality of position information patterns arranged on the display area and each representing information regarding a position thereof on the display area. Each position information pattern is formed of a plurality of optically readable marks that are formed from a material that transmits visible light. On the display area, the plurality of sub-pixels whose colors are different from each other are repeatedly aligned in a determined alignment direction. A length L between both ends of the mark in the alignment direction meets a relational expression of $n \times P + w \leq L \leq (n+1) \times P - w$ (n is an integer of 0 or greater) where a width of the sub-pixel in the alignment direction is w and a pitch between the pixels in the alignment direction is P.

In addition, a display device according to the present disclosure includes: a display panel having a display area on which a plurality of pixels each including a plurality of sub-pixels whose colors are different from each other are arranged in a matrix manner; and a plurality of position information patterns arranged on the display area and each representing information regarding a position thereof on the display area. Each position information pattern is formed of a plurality of optically readable marks that are formed from a material that transmits visible light. On the display area, the plurality of sub-pixels whose colors are different from each other are repeatedly aligned in a determined alignment direction. When the mark is seen from a front side, both ends of the mark in the alignment direction are located on the sub-pixels whose colors are different from each other, or at least one end of the mark in the alignment direction is located between the sub-pixels adjacent to each other in the alignment direction.

According to the present disclosure, it is possible to provide a display device that reduces influence of position information patterns, arranged on a display area, on the visibility of an image.

DETAILED DESCRIPTION

Hereinafter, an embodiment will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Hereinafter, in the present embodiment, a system in which a liquid crystal display device is used will be described as an example of a display control system 10 (an information display device) according to the present disclosure. However, another type of a display device such as an organic EL display device may be used for the display control system 10.

1. Regarding Entire Configuration of Display Control System Etc.

Figure 1:
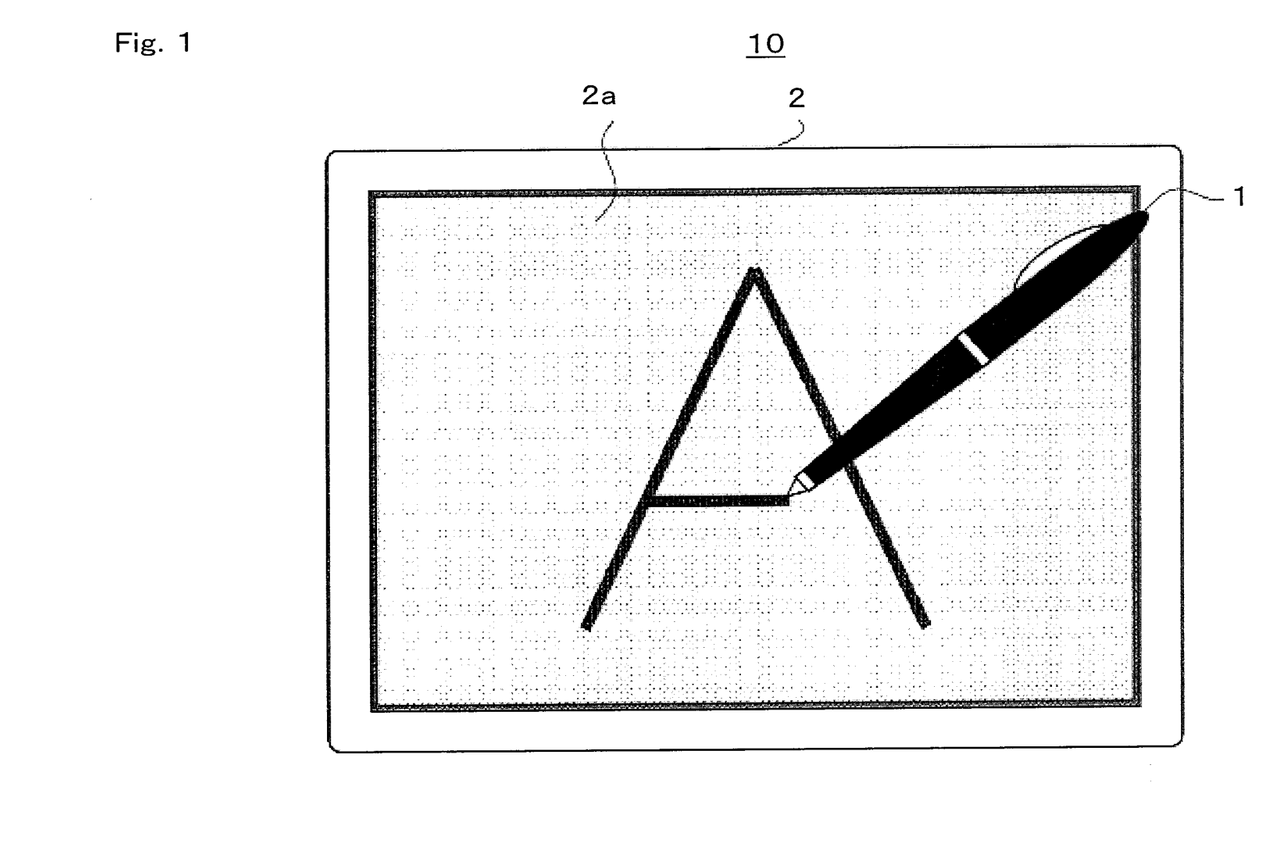
FIG. 1 is a schematic diagram showing a usage situation of a display control system according to one embodiment of the present disclosure.

FIG. 1 is a diagram showing a usage situation of the display control system 10 (the information display device) according to the embodiment of the present disclosure. As shown in FIG. 1, the display control system 10 includes an optical electronic pen 1 as a position pointing device capable of performing a handwriting input and a display device 2 that receives information regarding a position pointed to by the electronic pen 1 and includes a display panel 50 that displays a pen input image such as a character or a figure on a display surface 2a. It should be noted that although not shown in FIG. 1, a plurality of position information patterns 3 each of which is optically readable by the electronic pen 1 are arranged on a display area of the display panel 50 of the display device 2. Each position information pattern 3 has a plurality of dot-like marks 31.

In other words, in the display control system 10 according to the present disclosure, the position information patterns 3 each representing a position coordinate thereof on the display surface 2a are arranged on the display surface 2a of the display device 2. By the electronic pen 1 reading a position information pattern 3 as an optical image pattern, it is possible to identify a position coordinate (position information) at which the user performs a handwriting input on the display surface 2a. The electronic pen 1 reads a position information pattern 3 as an optical image pattern by applying detection light to the position information pattern 3. By so doing, when the tip of the electronic pen 1 is moved on the display surface 2a, it is possible to detect the trajectory of the tip of the electronic pen 1 (i.e., handwriting of a character or the like of which a handwriting input is performed by the user) from position information patterns 3 read continuously by the electronic pen 1.

In the display control system 10, position information that is information regarding a position pointed to by the electronic pen 1 and is identified by the electronic pen 1 is transmitted from the electronic pen 1 to the display device 2. On the basis of the position information received from the electronic pen 1, the display device 2 performs an operation of changing display information on the display surface 2a such that a pen input image is displayed on the display surface 2a. Therefore, the user is allowed to write a character, a figure, or the like on the display surface 2a of the display device 2 with the electronic pen 1 as if handwriting a character or the like on paper with a pen. In addition, it is also possible to use the electronic pen 1 like an eraser. In this case as well, similarly to the case where a character, a figure, or the like is written, the position of the tip of the electronic pen 1 is identified by the electronic pen 1 reading a position information pattern 3. Then, on the basis of the identified position information, the display device 2 performs an operation of deleting display information displayed on the display surface 2a. By so doing, it is possible to realize deletion of display information with the electronic pen 1.

Figure 2:
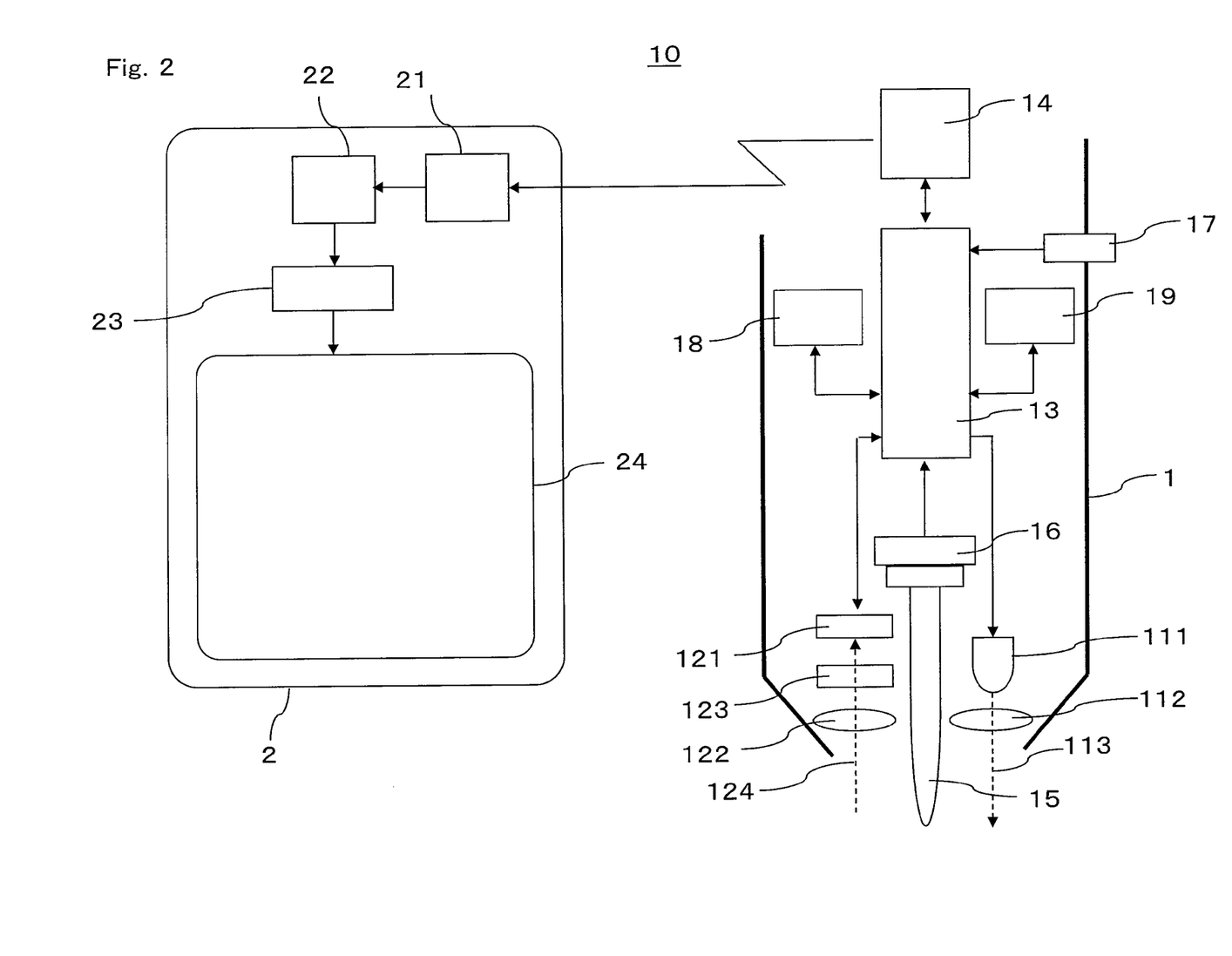
FIG. 2 is a schematic diagram showing the configuration of an electronic pen and the configuration of a display device in the display control system according to the embodiment of the present disclosure.

FIG. 2 is a schematic diagram showing the configuration of the electronic pen 1 and the configuration of the display device 2 in the display control system 10 according to the embodiment of the present disclosure.

As shown in FIG. 2, the electronic pen 1 includes an LED 111 that constitutes an infrared light irradiation section for emitting infrared light to the display device 2, a condenser lens 112 that condenses the light emitted from the LED 111, an image reading section 121 composed of an image sensor (CCD) that receives infrared light reflected on the display device 2 and captures an image of an position information pattern, a condenser lens 122 that causes the infrared light, reflected on the display device 2, to form an image on an imaging surface of the image reading section 121, and an infrared filter (IR filter) 123 that cuts visible light having passed through the condenser lens 122. Infrared light 113 emitted from the LED 111 of the electronic pen 1 is condensed by the condenser lens 112 and applied to the display surface 2a of the display device 2 that is pointed to by the tip of the electronic pen 1. The infrared light applied to the display surface 2a passes through the display panel 50 and is diffusely reflected on a later-described diffuse reflection sheet 48. Regardless of the inclination of the electronic pen 1, part of the infrared light is reflected on the diffuse reflection sheet 48 toward the electronic pen 1 side. Then, infrared light 124 that is reflected on the diffuse reflection sheet 48 and outputted from the display device 2 is condensed by the condenser lens 122, passes through the infrared filter (IR filter) 123, which cuts visible light, and is incident on the image reading section 121. Here, each mark 31 is formed from a material that absorbs infrared light (a material having a low transmittance for infrared light). Thus, almost no infrared light returns from each mark 31 to the electronic pen 1. On the other hand, a more amount of infrared light returns from a region between each mark 31 than from the region of each mark 31. As a result, an optical image in which the position information pattern 3 is represented in black is captured by the image reading section 121.

In other words, infrared light in a reading area having a determined range, of the display surface 2a of the display device 2, is condensed by the condenser lens 122 on the imaging surface (light receiving surface) of the image reading section 121, and an image of the position information pattern 3 included in the reading area is read by the image reading section 121. Information of the image read by the image reading section 121 is transmitted to a processing circuit section 13. The processing circuit section 13 recognizes an image of the dot-like marks 31 included in the position information pattern 3, processes data of the recognized image of the marks 31, and detects, as position information, a coordinate of a position pointed to by the tip of the electronic pen 1. In addition, the processing circuit section 13 converts the detected position information to a data signal and transmits the data signal to a transmission section 14. The transmission section 14 transmits the data of the position information (position coordinate) to a reception section 21 of the display device 2 via wireless communication.

In the display device 2, the data of the position information received by the reception section 21 is processed by a processing circuit section 22, a panel driving circuit section 23 is controlled on the basis of the processed data, and a display operation of a display panel 24 is controlled. By so doing, a character, a figure, or the like is displayed on the display surface 2a of the display panel 24 on the basis of the position coordinate identified by the electronic pen 1.

The series of operations described above is performed when a pen tip portion 15 arranged at the tip of the electronic pen 1 is in contact with the display surface 2a. Specifically, the pen tip portion 15 is arranged at the tip of the electronic pen 1, and a pressure sensor 16 that senses a writing pressure of the pen tip portion 15 is arranged within the electronic pen 1. When the pen tip portion 15 comes into contact with the display surface 2a of the display device 2, information of a pressure sensed by the pressure sensor 16 is transmitted from the pressure sensor 16 to the processing circuit section 13. In response to the signal transmitted from the pressure sensor 16, the processing circuit section 13 performs processing (a reading operation) on reading output of the image reading section 121.

It should be noted that the present disclosure is not limited to the configuration in which a reading operation is performed when the tip of the electronic pen 1 is in contact with the display surface 2a, and, for example, a switch 17 used in order that the user inputs a reading instruction may be provided in the electronic pen 1. In such a case, in response to the switch 17 being pressed, the processing circuit section 13 performs a reading operation. Thus, even when the electronic pen 1 is separated from the display surface 2a, it is possible to perform a reading operation.

In addition, the position coordinate of the pen tip (pen tip coordinate) identified by the electronic pen 1 is changed in accordance with the inclination of the electronic pen 1. Thus, an angle sensor 18 for detecting the inclination of the electronic pen 1 is provided within the electronic pen 1. For example, when the electronic pen 1 is vertically directed, the pen tip coordinate is directly below the electronic pen 1. When the electronic pen 1 is greatly inclined, the pen tip coordinate is at a position greatly away from the position directly below the electronic pen 1. The inclination of the electronic pen 1 is measured with the angle sensor 18, and inclination data of the electronic pen 1 is transmitted to the processing circuit section 13, and the processing circuit section 13 corrects the position information that is identified from the position information pattern 3 obtained by the image reading section 121, on the basis of the inclination data of the electronic pen 1. By so doing, it is possible to obtain accurate position information without being influenced by the inclination of the electronic pen 1.

In addition, an acceleration sensor 19 for detecting a moving speed (including acceleration) of the electronic pen 1 is provided within the electronic pen 1. The acceleration sensor 19 transmits data of a detected moving direction of and data of detected acceleration of the electronic pen 1 to the processing circuit section 13. Then, it is possible to obtain a moving amount, a moving direction, and the like of the electronic pen 1 by calculation of the processing circuit section 13 from the moving direction data and the acceleration data of the electronic pen 1.

2. Regarding Position Information Patterns

Figure 3:
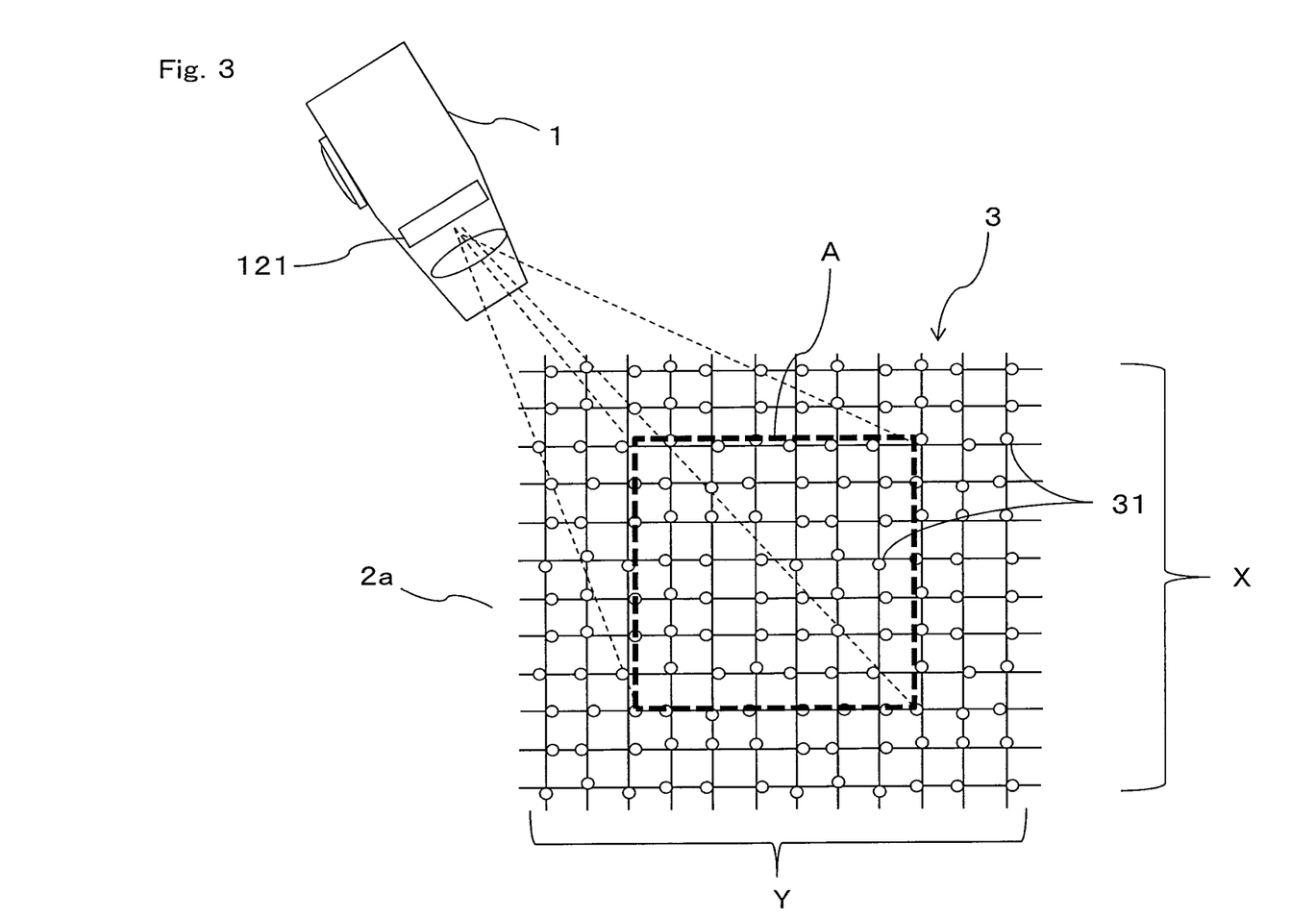
FIG. 3 an explanatory diagram showing an example of position information patterns arranged on a display surface of the display device.
Figure 4:
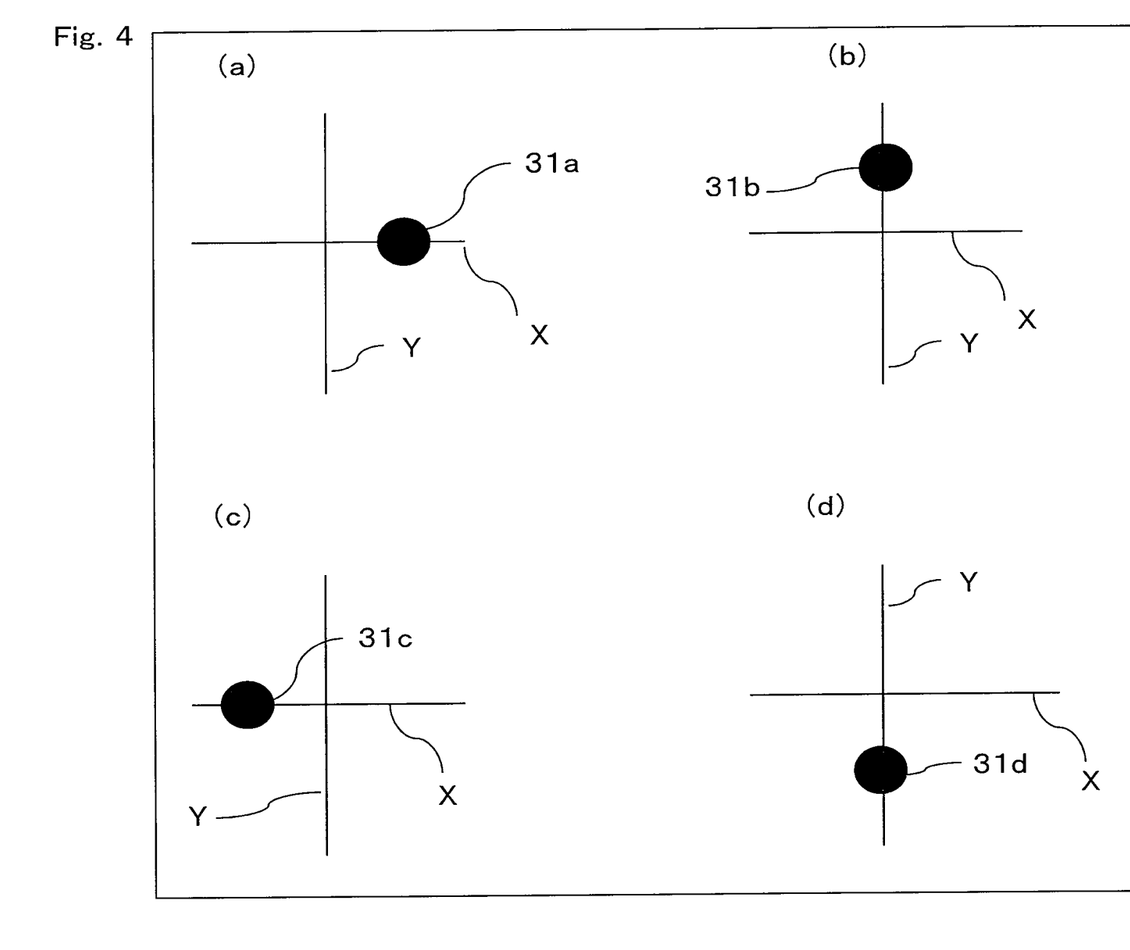
FIG. 4 is an explanatory diagram for explaining an example of a method for obtaining a position coordinate from a position information pattern.

FIGS. 3 and 4 are explanatory diagrams for explaining an example of the position information patterns 3 arranged on the display surface 2a of the display device 2 and an example of a method for obtaining a position coordinate from the position information pattern 3.

As shown in FIG. 3, a plurality of marks 31 are arranged on the display area of the display surface 2a of the display device 2 in a specific array pattern. On the display area, the position information patterns 3 are formed of the plurality of marks 31. Specifically, when a pixel area of m dots×n dots (e.g., 6 dots×6 dots) within the display surface 2a is set as a unit area A, a position information pattern 31 is formed of a plurality of marks 31 within the unit area A. By the electronic pen 1 reading the marks 31 formed in the position information pattern 3 within the unit area A, the position coordinate pointed to by the tip of the electronic pen 1 is identified.

FIGS. 4(a) to 4(d) are explanatory diagrams for explaining an example of arrangement patterns of each mark 31 in each position information pattern 3 and a method for position coordinate transformation. In this example, as shown in FIGS. 4(a) to 4(d), each mark 31 is arranged near the intersection of a virtual reference line X and a virtual reference line Y. In FIG. 3, a grid is formed of a plurality of reference lines X and a plurality of reference lines Y. Each of marks 31a to 31d is arranged at a position shifted from the intersection (grid point) of the reference line X and the reference line Y toward the right side (FIG. 4(a)), the upper side (FIG. 4(b)), the left side (FIG. 4(c)), or the lower side (FIG. 4(d)). For example, characters "1", "2", "3", and "4" are assigned to the marks 31a, 31b, 31c, and 31d, respectively. Each character is for representing a position coordinate of a unit area read by the electronic pen 1. In other words, the position coordinate of the unit area is represented by a plurality of characters obtained by converting a plurality of marks 31 within the unit area. As shown in FIG. 3, by the electronic pen 1 reading the marks 31 formed in the position information pattern 3 within the unit area A, it is possible to identify the position coordinate of the read unit area A.

In other words, for example, each of the 36 marks 31 within the unit area A of 6 dots×6 dots is arranged in the position information pattern 3 in any one of the four kinds of arrangement patterns shown in FIGS. 4(a) to 4(d). With regard to the 36 marks 31, by combining the four kinds of arrangement patterns in accordance with a position within the display surface 2a, it is possible to form a position information pattern 3 representing a coordinate of the position thereof.

Here, each mark 31 in each position information pattern 3 is formed from a material that transmits visible light. For example, each mark 31 is formed from a material having a transmittance of 90% or higher for visible light. Thus, it is possible to reduce influence of each mark 31 on a display image, in the visible light range, which is displayed on the display surface 2a of the display device 2. In addition, each mark 31 is formed from a material that absorbs infrared light (a material having a low transmittance for infrared light) as described above. For example, each mark 31 is formed from a material having a transmittance of 50% or lower (e.g., 20% or lower) for infrared light.

It should be noted that each mark 31 may be formed from a material having light-scattering properties or diffraction grating properties such that the direction of incident light is changed when infrared light is applied thereto. In such a case, since each mark 31 has light-scattering properties or diffraction properties, light incident on each mark 31 is reflected (scattered, diffused, diffracted, changed in phase, or bent) on each mark 31 and outputted to the outside of the display device 2. It is possible to detect each mark 31 by the reflected light.

For example, when each mark 31 is formed from a material that diffusely reflects infrared light, infrared light incident on each mark 31 from the outside of the display device 2 is diffusely reflected on each mark 31, and thus part thereof surely returns to the electronic pen 1 side. On the other hand, the region between each mark 31 specularly reflects infrared light. From the region between each mark 31, almost no infrared light returns to the electronic pen 1 side. Thus, an optical image in which the marks 31 are represented in white is captured by the image reading section 121.

3. Regarding Display Panel

Next, an example of the configuration of the display panel 50 of the display device 2 will be described.

Figure 5:
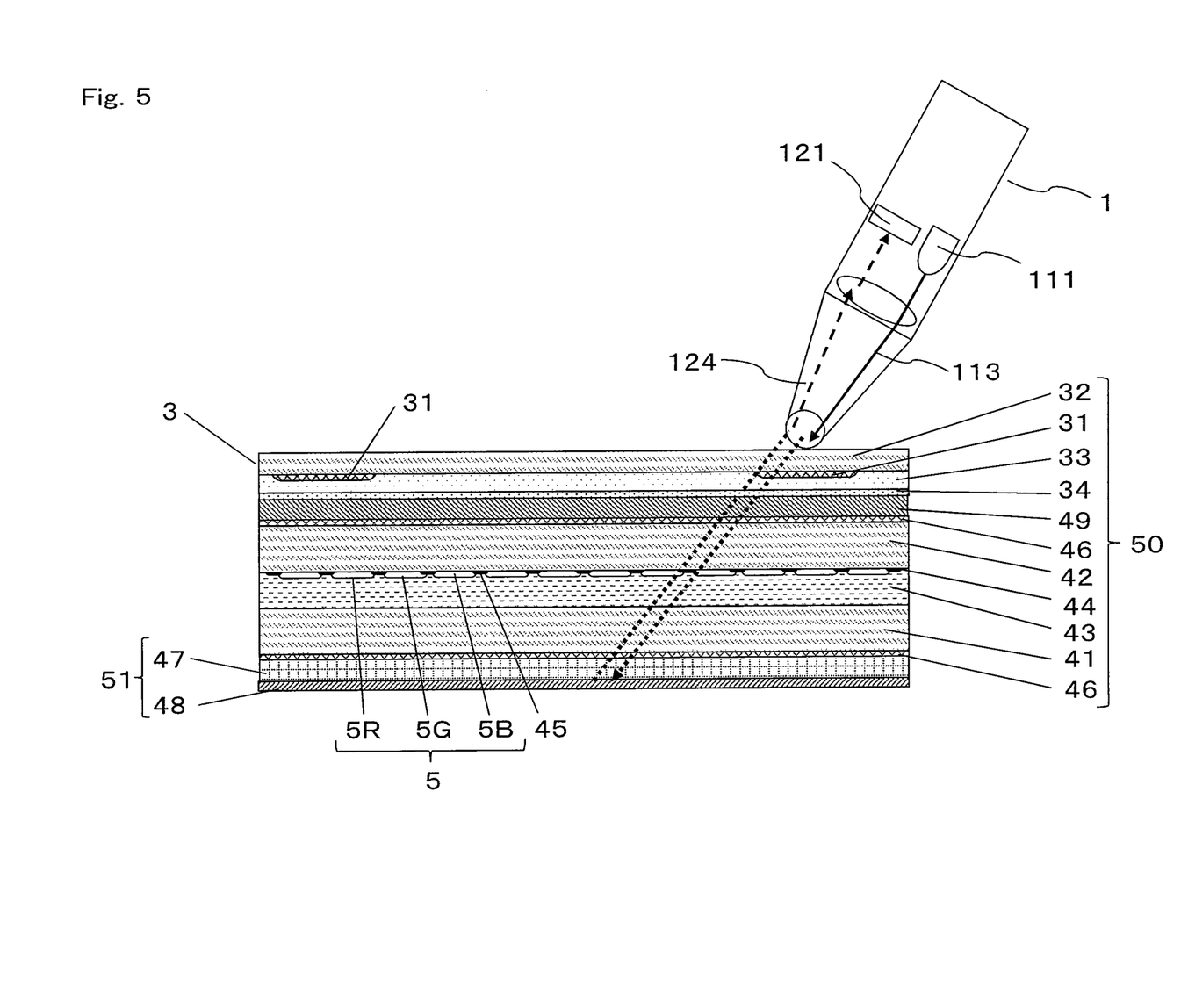
FIG. 5 is a schematic configuration diagram of a display panel in which the position information patterns are arranged.

FIG. 5 is a schematic configuration diagram showing the configuration of the display panel 50 in which the position information patterns 3 are arranged. The display panel 50 shown in FIG. 5 is an example of an active matrix type TFT color liquid crystal display panel.

In FIG. 5, a liquid crystal panel section 50 (a display panel) is formed by enclosing a liquid crystal member 43 between two substrates 41 and 42 opposed to each other. Each of the substrates 41 and 42 is a plate having optical transparency, and, for example, a glass substrate may be used. It should be noted that although not shown, thin film transistors, which are crystal liquid driving components, a first transparent electrode, a signal electrode, and a scanning electrode are formed on the substrate 41 on the back side (the lower side in FIG. 5) in the liquid crystal panel section 50. In addition, pixels 5 each composed of at least a red sub-pixel 5R, a green sub-pixel 5G, and a blue sub-pixel 5B, a black matrix 45 that separates the pixels 5 and the sub-pixels 5R, 5G, and 5B, and a second transparent electrode are formed on the back side of the substrate 42 on the front side (the upper side in FIG. 5). The black matrix 45 is a light shielding member that has openings corresponding to the sub-pixels 5R, 5G, and 5B, is composed of a metal thin film of chromium or the like, and shields the boundary portions between the sub-pixels 5R, 5G, and 5B from light. The pixels 5 and the black matrix 45 are formed on a color filter 44. The enclosed liquid crystal member 43 is arranged between the transparent electrodes formed on the two substrates 41 and 42. In addition, polarizing plates 46 are arranged on outer surfaces of the substrates 41 and 42, respectively. The polarizing plates 46 are attached to the substrates 41 and 42, respectively.

It should be noted that the color filter 44 is not limited to the RGB color filter. Sub-pixels of cyan (C), magenda (M), yellow (Y), or the like may be formed on the color filter 44, or sub-pixels of white (W) may be formed on the color filter 44.

A backlight unit 51 is arranged on the lower side of the polarizing plate 46 at the back side (i.e., the lower side in FIG. 5) of the liquid crystal panel section 50. The backlight unit 51 includes a surface light source member 47 and the diffuse reflection sheet 48. In addition, an on-cell type capacitance touch panel 49 is arranged on the upper side of the polarizing plate 46 at the display surface side (i.e., the upper side in FIG. 5) of the liquid crystal panel section 50. It should be noted that the touch panel 49 may be an in-cell type touch panel, or another type of touch panel such as a resistive pressure-sensitive type. Alternatively, the touch panel 49 may be omitted from the liquid crystal panel section 50.

The liquid crystal panel section 50 has a configuration in which a plurality of the pixels 5 each composed of a plurality of the sub-pixels 5R, 5G, and 5B whose colors are different from each other are arranged in a matrix manner. The liquid crystal panel section 50 controls ON/OFF of each of thin film transistors for the sub-pixels 5R, 5G, and 5B constituting each pixel 5 and selectively controls the polarization of the liquid crystal member 43, whereby it is possible to perform a color display of a character or an image.

In addition, a plurality of the position information patterns 3 from each of which position information is read by the electronic pen 1 are arranged on the touch panel 49 of the liquid crystal panel section 50. Each position information pattern 3 has a plurality of marks 31. The position information pattern 3 is configured by forming a plurality of marks 31 having a circular shape, a quadrate shape, or the like in a determined array pattern on a translucent base film 32 made of resin, and forming a translucent resin layer 33 on the base film 32 such that the resin layer 33 covers the plurality of marks 31, as shown in FIG. 5. The resin layer 33 is a layer for adjusting a refractive index, and its refractive index is slightly different from that of each mark 31. In addition, an adhesive layer 34 made of a translucent adhesive material is provided on the resin layer 33. The resin layer 33 is attached on the touch panel 49 of the liquid crystal panel section 50 by the adhesive layer 34 such that the base film 32 is on the front side of the liquid crystal panel section 50.

Each mark 31 in each position information pattern 3 is formed from a material that transmits visible light and absorbs infrared light. Thus, it is possible to reduce influence of each mark 31 on a color display image, in the visible light range, which is displayed on the liquid crystal panel section 50.

As shown in FIG. 5, first, the infrared light 113 emitted from the electronic pen 1 is applied to the position information pattern 3. Then, as described above, the infrared light 113 is diffusely reflected on the diffuse reflection sheet 48, and part of the infrared light 113 is reflected toward the electronic pen 1 side. Then, the infrared light 124 reflected toward the electronic pen 1 side passes through a region where the position information pattern 3 is formed. At that time, in the position information pattern 3, the infrared light 124 is absorbed in a region where each mark 31 is arranged, and the infrared light 124 is transmitted in a region where no mark 31 is arranged. Thus, the infrared light 124 incident on the electronic pen 1 is received by the image reading section 121 and the position information pattern 3 is read therefrom, whereby it is possible to detect position information (coordinate information) represented by the marks 31 formed in the position information pattern 3.

4. Regarding Positional Relationships Between Pixels and Marks

Next, the positional relationships between the pixels 5 and the marks 31 will be described.

Figure 6:
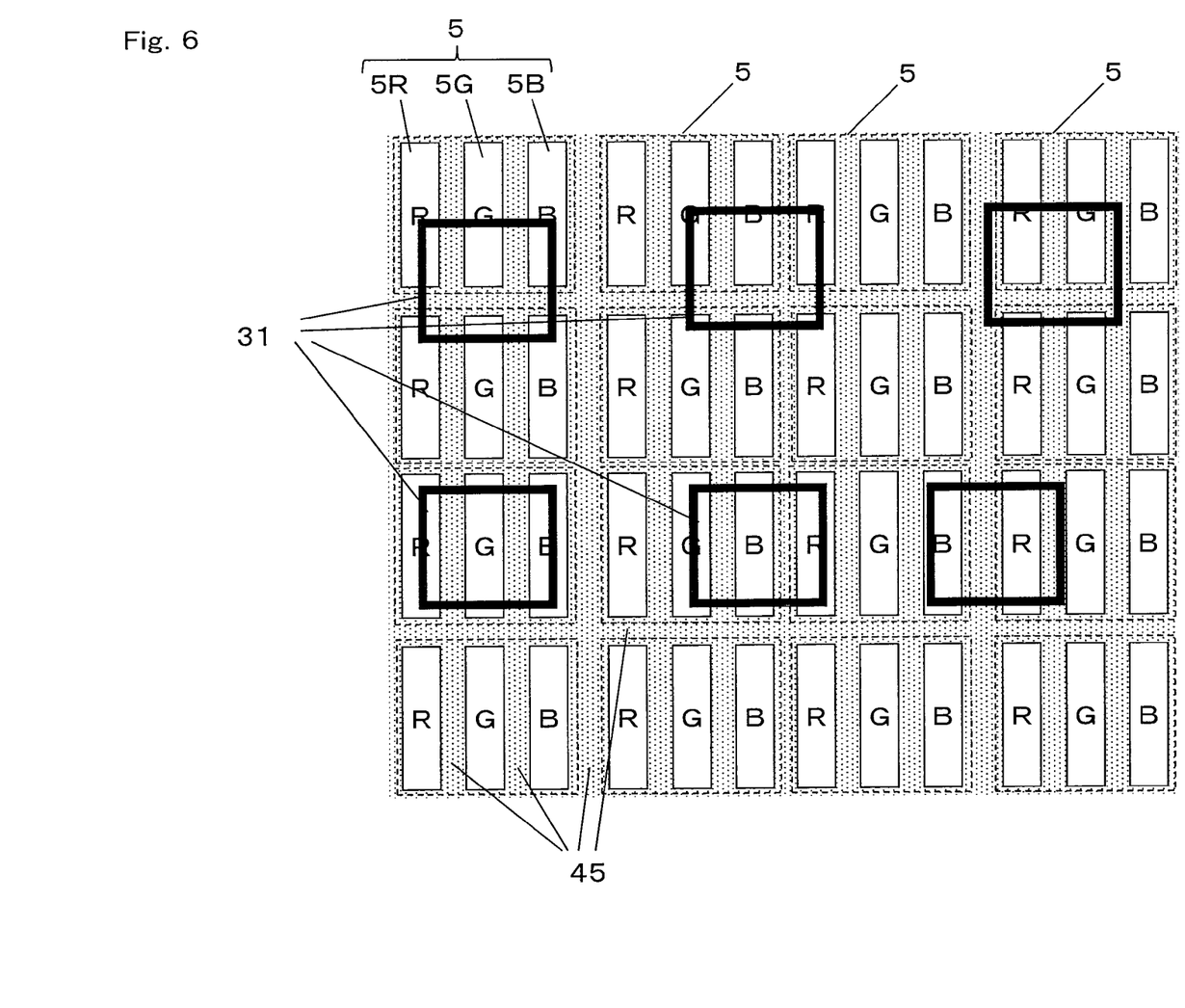
FIG. 6 is a schematic diagram showing examples of the positional relationships between pixels and marks.

FIG. 6 is a schematic diagram showing examples of the positional relationships between the pixels 5 and the marks 31 in the position information pattern 3. As shown in FIG. 6, each pixel 5 is composed of a red sub-pixel 5R, a green sub-pixel 5G, and a blue sub-pixel 5B. It should be noted that in the example shown in FIG. 6, the arrangement of the sub-pixels 5R, 5G, and 5B is a stripe type. In other words, in a plurality of pixels 5 aligned in the horizontal direction, a plurality of sub-pixels 5R, 5G, and 5B whose colors are different from each other are repeatedly arranged in the same arrangement. On the other hand, in a plurality of pixels 5 aligned in the vertical direction, sub-pixels 5R, 5G, and 5B having the same colors are continuously arranged.

In FIG. 6, when each quadrate mark 31 in the position information pattern 3 is seen from the front side, both ends, in the horizontal direction (the direction in which the sub-pixels 5R, 5G, and 5B having different colors are aligned), of the outer periphery of the mark 31 are located on sub-pixels whose colors are different from each other among the RGB sub-pixels 5R, 5G, and 5B of the pixels 5, or at least one end of the mark 31 in the horizontal direction is located between the sub-pixels 5R, 5G, and 5B adjacent to each other in the horizontal direction (i.e., on the black matrix 45). It should be noted that a part of the region between the sub-pixels 5R, 5G, and 5B adjacent to each other in the horizontal direction is also the region between the pixels 5.

Figure 7:
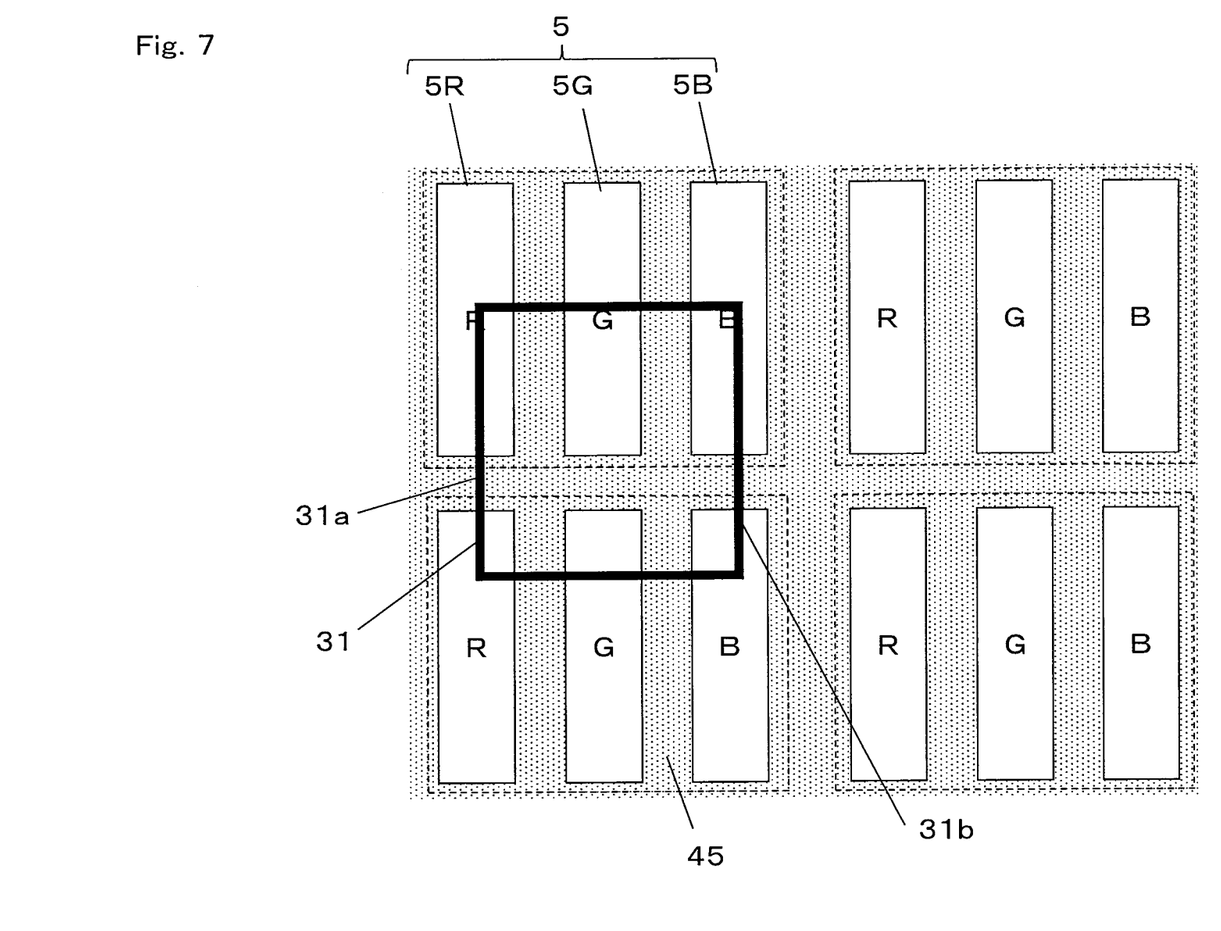
FIG. 7 is an enlarged view of a principal part of FIG. 6.

Specifically, as shown in an enlarged manner in FIG. 7, when the mark 31 is seen from the front side, if a side 31a of the mark 31 in the horizontal direction is present at a position on the red sub-pixels 5R, the quadrate mark 31 is arranged such that another opposing side 31b thereof is present at a position on the blue sub-pixels 5B other than the red sub-pixels 5R. Furthermore, the mark 31 is arranged such that the surface area where the mark 31 overlaps the green sub-pixels 5G that do not overlap both ends of the mark 31 in the horizontal direction is the largest among the surface areas where the mark 31 overlaps the sub-pixels 5R, 5G, and 5B of the three colors. As a matter of course, the other opposing side 31b may be present at a position on the green sub-pixels 5G other than the red sub-pixels 5R or at a position on the black matrix 45 present between the sub-pixels 5R, 5G, and 5B (between which the part of the region is between the pixels 5), and suffices to not be present on any sub-pixel 5 whose color is the same as those on which the side 31a is present.

Figure 8:
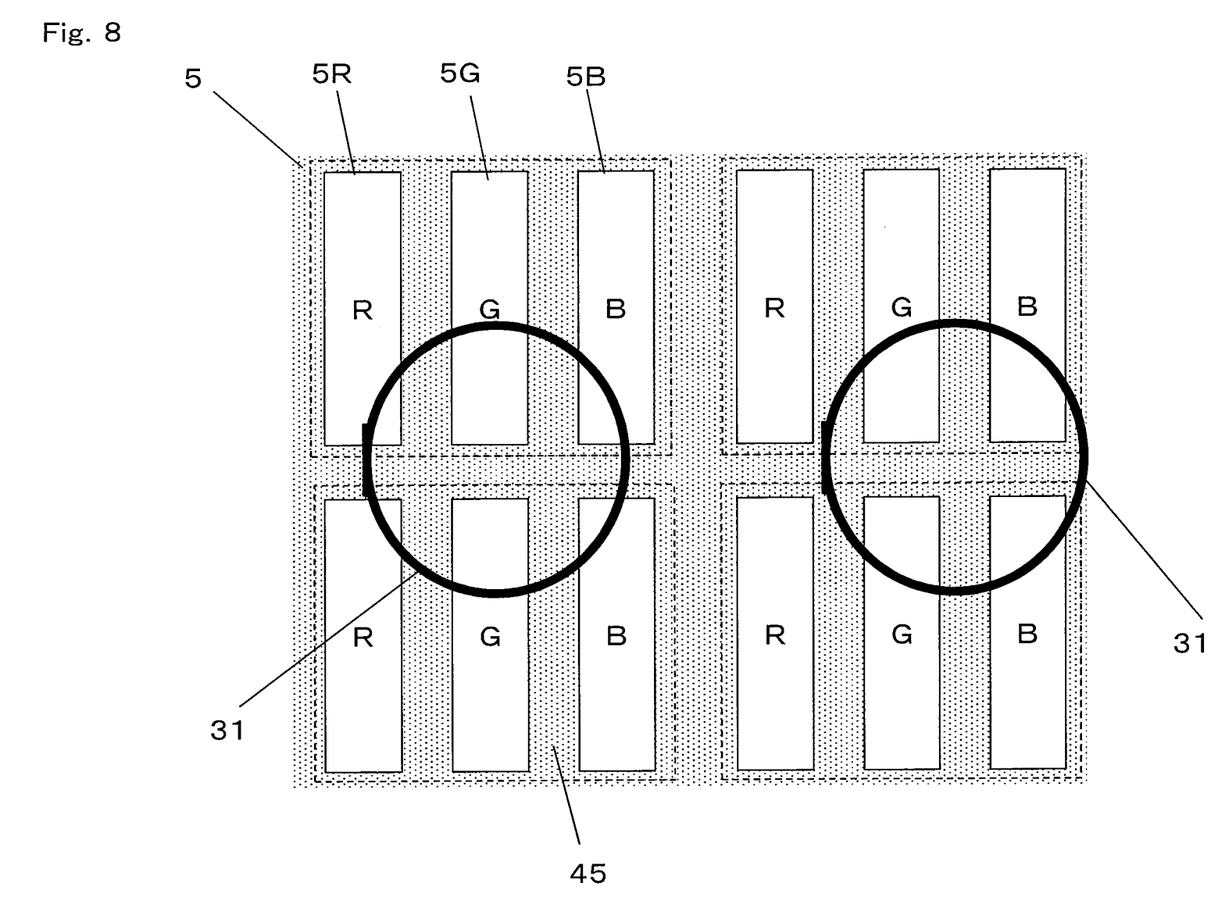
FIG. 8 is a schematic diagram showing an example of the positional relationships between pixels and marks whose shapes are different from that in FIG. 7.

The example shown in FIG. 6 is a case of the quadrate marks 31. Also in a case of circular or rhombic marks 31, similarly, when each mark 31 is seen from the front side, both ends, in the horizontal direction (the direction in which the sub-pixels 5R, 5G, and 5B having different colors are aligned), of the outer periphery of the mark 31 may be located on sub-pixels whose colors are different from each other among the RGB sub-pixels 5R, 5G, and 5B of the pixels 5, or at least one end of the mark 31 in the horizontal direction may be located between the sub-pixels 5R, 5G, and 5B adjacent to each other in the horizontal direction (between which the part of the region is between the pixels 5). FIG. 8 shows a case with circular marks 31.

In addition, in FIGS. 6 to 8, a contour line of the outer periphery of each of the marks 31 is merely shown for easy understanding of the positional relationships between the marks 31 and the pixels 5. However, as described above with reference to FIGS. 3 to 5, the entirety of each mark 31 is formed in a dot-like quadrate shape from the material that transmits visible light.

Meanwhile, when both ends, in the horizontal direction, of the outer periphery of the mark 31 are present at positions on sub-pixels having the same color among the sub-pixels 5R, 5G, and 5B, the pixels 5 that overlap the mark 31 are colored intensely in a color different from a desired color to be represented, in accordance with the relative position of the mark 31. It is recognized that due to this, a color moire phenomenon occurs when the entirety of the display surface 2a of the display device 2 on which the position information patterns 3 are arranged is seen. This is thought to be because when visible light passes through the mark 31, refraction or scattering of the light occurs at the interface between the mark 31 and the resin layer 33, and light having the same color as that of the sub-pixels overlapping the ends of the mark 31, among the sub-pixels 5R, 5G, and 5B, is attenuated. In other words, this is thought to be because, due to the refraction or scattering of the light, the sub-pixels overlapping the ends of the mark 31, among the sub-pixels 5R, 5G, and 5B, appear in a color different from the color of the sub-pixels immediately before the light passes through the mark 31.

For example, when both ends of the mark 31 are present on the red sub-pixels 5R, red color is attenuated and the portion where the mark 31 is present appears to be colored in blue-green. When both ends of the mark 31 are present on the green sub-pixels 5G, green color is attenuated and the portion where the mark 31 is present appears to be colored in purple. When both ends of the mark 31 are present on the blue sub-pixels 5B, blue color is attenuated and the portion where the mark 31 is present appears to be colored in yellow-green.

Figure 9:
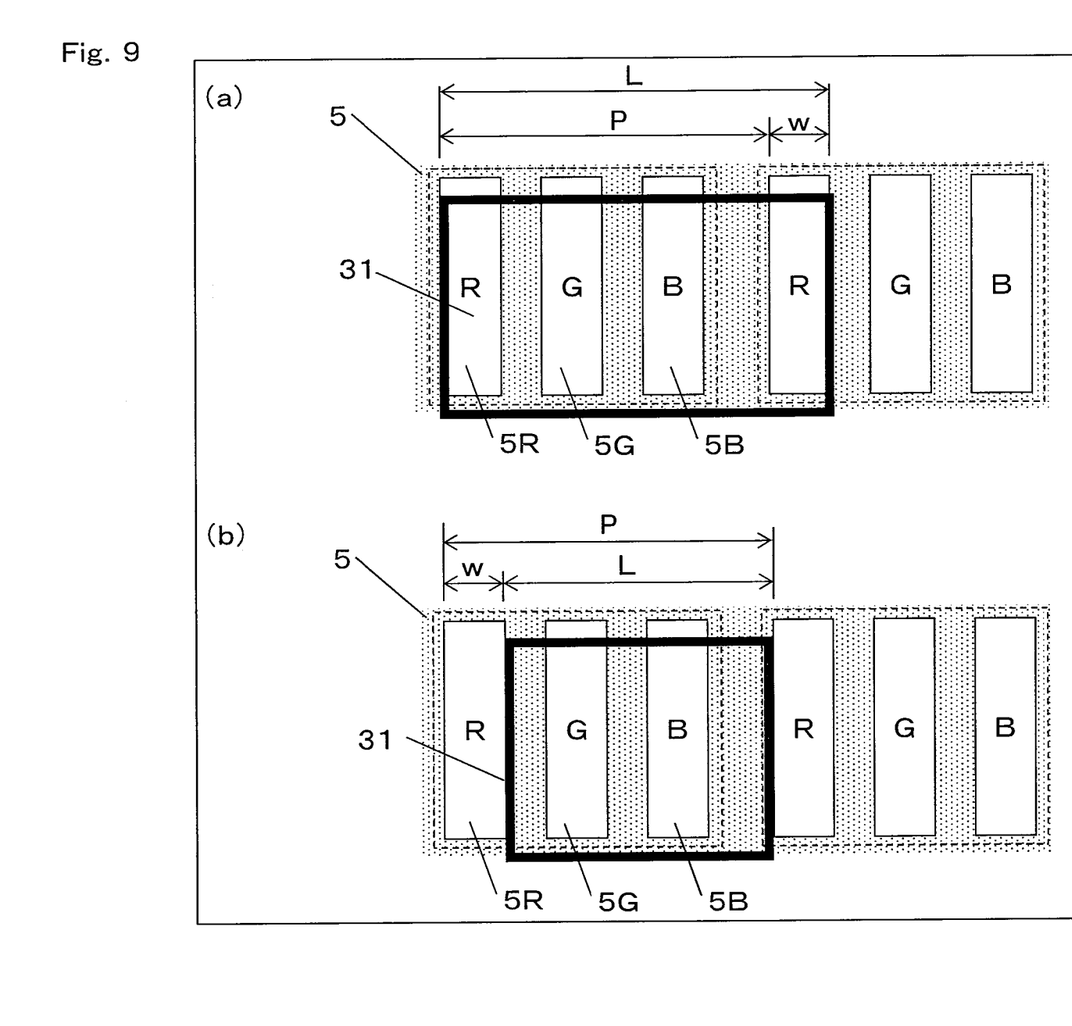
FIG. 9 is an explanatory diagram for explaining a numerical range for the width of each mark.

Here, a case will be described in which L=P+w where the length (width) between both ends of the mark 31 in the direction in which the sub-pixels 5R, 5G, and 5B are aligned (the horizontal direction in FIG. 9) is L; the width of each of the sub-pixels 5R, 5G, and 5B in the alignment direction is w; and the pitch between the adjacent pixels 5 (the distance between the centers of the adjacent pixels 5) in the alignment direction is P. FIG. 9(a) is a diagram in the case where L=P+w. In this case, as is obvious from FIG. 9(a), when the length L of the mark 31 is decreased even slightly, a state where both ends of the mark 31 in the horizontal direction are located on sub-pixels having the same color among the sub-pixels 5R, 5G, and 5B is provided, depending on the positional relationship between the pixels 5 and the mark 31.

Subsequently, a case where L=P−w will be described. FIG. 9(b) is a diagram in the case where L=P−w. In this case, as is obvious from FIG. 9(b), when the length L of the mark 31 is increased even slightly, a state where both ends of the mark 31 in the horizontal direction are located on sub-pixels having the same color among the sub-pixels 5R, 5G, and 5B is provided, depending on the positional relationship between the pixels 5 and the mark 31.

Accordingly, in a case where P−w<L<P+w, a state where both ends of the mark 31 in the horizontal direction are located on sub-pixels having the same color among the sub-pixels 5R, 5G, and 5B is provided, depending on the positional relationship between the pixels 5 and the mark 31. Then, there is a concern that a color moire phenomenon occurs due to scattering or the like of light at both ends of the mark 31.

Thus, in the present embodiment, the length L between both ends of each mark 31 in the direction in which the sub-pixels 5R, 5G, and 5B are aligned (the horizontal direction in FIG. 9) is set so as to meet a relational expression of $n \times P + w \leq L \leq (n+1) \times P - w$. n is an integer of 0 or greater (n=0 in FIG. 6). When the length L of each mark 31 is set in this manner, it is possible to suppress occurrence of a color moire phenomenon, regardless of the positional relationship between the pixels 5 and the mark 31.

5. Advantageous Effects Etc.

In the present embodiment, with regard to each mark 31 in each position information pattern 3, in a state where both ends of the mark 31 in the direction in which a plurality of the sub-pixels 5R, 5G, and 5B whose colors are different from each other are repeatedly aligned are located on different pixels, both ends of the mark 31 in the direction are located on sub-pixels whose colors are different from each other among the sub-pixels 5R, 5G, and 5B. Or, at least one end of the mark 31 in the alignment direction is located between the sub-pixels 5R, 5G, and 5B. As a result, each mark 31 is arranged such that the surface area where the mark 31 overlaps the sub-pixel of the color that does not overlap both ends of the mark 31 is the largest among the surface areas where the mark 31 overlaps the sub-pixels 5R, 5G, and 5B. Thus, any pixel 5 that overlaps each mark 31 is not colored intensely in a different color in accordance with the relative position of each mark 31. Therefore, it is possible to reduce occurrence of a color moire phenomenon when the entirety of the display surface 2a of the display device 2 on which the position information patterns 3 are arranged is seen, and it is possible to realize the display control system 10 that enables a highly fine handwriting input.

It should be noted that in the present disclosure, the size of each mark 31 in each position information pattern 3 suffices to be such a size that each mark 31 overlaps at least two of the sub-pixels 5R, 5G, and 5B. For example, the length between both ends of each mark 31 in the alignment direction suffices to be equal to or larger than twice that of the width of each sub-pixel in the alignment direction.

Other Embodiments

As described above, the embodiment has been described as an illustrative example of the technology disclosed in the present application. However, the technology in the present disclosure is not limited thereto, and is also applicable to embodiments in which changes, substitutions, additions, omissions, and/or the like are made as appropriate. In addition, each constituent element described in the embodiment can be combined to provide a new embodiment.

Other embodiments will be described below.

In the embodiment, each position information pattern 3 represents a position coordinate on the display surface 2a, but the present disclosure is not limited thereto. Each position information pattern 3 suffices to represent information regarding a position on the display area, and each position information pattern 3 may represent information associated with a position coordinate on a control table.

In the embodiment, in the electronic pen 1, position information is identified from an image pattern obtained by reading the position information pattern 3, but the present disclosure is not limited thereto. For example, image data of an image pattern may be transmitted from the electronic pen 1 to the display device 2, and the display device 2 may identify position information on the basis of the received image data.

In the embodiment, the arrangement of the sub-pixels is a stripe type, but is not limited thereto. The arrangement of the sub-pixels may be a diagonal type, a delta type, or the like.

In the embodiment, the position information patterns 3 are provided on the front side with respect to the touch panel 49, but the position information patterns 3 may be provided on the back side with respect to the touch panel 49.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A display device comprising:
a display panel having a display area on which a plurality of pixels each including a plurality of sub-pixels whose colors are different from each other are arranged in a matrix manner; and
a plurality of position information patterns arranged on the display area and each representing information regarding a position thereof on the display area, wherein
each position information pattern is formed of a plurality of optically readable marks that are formed from a material that transmits visible light,
on the display area, the plurality of sub-pixels whose colors are different from each other are repeatedly aligned in a determined alignment direction, and
a length L between both ends of the mark in the alignment direction meets a relational expression of $n \times P + w \leq L \leq (n+1) \times P - w$ (n is an integer of 0 or greater) where a width of the sub-pixel in the alignment direction is w and a pitch between the pixels in the alignment direction is P.

2. A display device comprising:
a display panel having a display area on which a plurality of pixels each including a plurality of sub-pixels whose colors are different from each other are arranged in a matrix manner; and
a plurality of position information patterns arranged on the display area and each representing information regarding a position thereof on the display area, wherein:
each position information pattern is formed of a plurality of optically readable marks that are formed from a material that transmits visible light,
on the display area, the plurality of sub-pixels whose colors are different from each other are repeatedly aligned in a determined alignment direction,
when the mark is seen from a front side, both ends of the mark in the alignment direction are located on the sub-pixels whose colors are different from each other, or at least one end of the mark in the alignment direction is located between the sub-pixels adjacent to each other in the alignment direction, and
each mark is arranged such that a surface area where the mark overlaps the sub-pixel of the color that does not overlap both ends of the mark is the largest among surface areas where the mark overlaps the plurality of sub-pixels of the colors.

3. The display device according to claim 1, wherein the length between both ends of each mark in the alignment direction is equal to or larger than twice that of a width of each sub-pixel in the alignment direction.

4. The display device according to claim 1, wherein a stripe type arrangement is used for the plurality of sub-pixels in the plurality of pixels.

5. A display control system comprising:
the display device according to claim 1; and
a position pointing device used in order that a user performs an input operation on the display device via the display area and configured to read the position information pattern present at an input operation position to which the input operation is performed, wherein
a display content of the display device is controlled on the basis of the input operation position identified from the position information pattern read by the position pointing device.

6. A display device comprising:
a display panel having a display area on which a plurality of pixels each including a plurality of sub-pixels whose colors are different from each other are arranged in a matrix manner; and
a plurality of position information patterns arranged on the display area and each representing information regarding a position thereof on the display area, wherein:
each position information pattern is formed of a plurality of optically readable marks that are formed from a material that transmits visible light,
on the display area, the plurality of sub-pixels whose colors are different from each other are repeatedly aligned in a determined alignment direction,
when the mark is seen from a front side, both ends of the mark in the alignment direction are located on the sub-pixels whose colors are different from each other, or at least one end of the mark in the alignment direction is located between the sub-pixels adjacent to each other in the alignment direction, and
a length between both ends of each mark in the alignment direction is equal to or larger than twice that of a width of each sub-pixel in the alignment direction.

7. The display device according to claim 2, wherein a stripe type arrangement is used for the plurality of sub-pixels in the plurality of pixels.

8. A display control system comprising:
the display device according to claim 2; and
a position pointing device used in order that a user performs an input operation on the display device via the display area and configured to read the position information pattern present at a position to which the input operation is performed, wherein
a display content of the display device is controlled on the basis of the position to which the input operation is performed and which is identified from the position information pattern read by the position pointing device.

* * * * *